UNITED STATES PATENT OFFICE.

CARL HEIDENREICH, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

BLUE AZO DYE.

No. 891,931.   Specification of Letters Patent.   Patented June 30, 1908.

Application filed March 10, 1908. Serial No. 420,250.

*To all whom it may concern:*

Be it known that I, CARL HEIDENREICH, doctor of philosophy, chemist, citizen of the German Empire, residing at Vohwinkel, near Elberfeld, Kingdom of Prussia, Germany, have invented new and useful Improvements in Blue Azo Dye, of which the following is a specification.

I have found that new and valuable azo dyestuffs dyeing wool pure blue bright shades fast to alkalies and to light can be obtained by combining the diazocompounds of para-amino-meta-chloro-dialkylanilins having the formula:

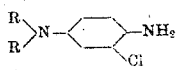

(R standing for alkyl) with 1:8:3:6-dioxynaphthalene disulfonic acid (chromotropic acid).

The hitherto unknown para-amino-meta-chloro-dialkylanilins are obtained by reducing the nitroso-compounds of meta-chloro-dialkylanilins. The para - amino - meta - chloro-dimethylanilin forms crystals melting at 42° C. The para-amino-meta-chloro-diethylanilin is a colorless limpid oil which darkens on being kept. It boils at 285° C. under a pressure of 760 mm.

The new dyestuffs are after being dried and pulverized dark powders soluble in water with a blue color and dyeing wool from acid baths blue shades. They yield upon reduction with stannous chlorid and hydrochloric acid para - amino - meta - chloro - d'alkylanilin and 2-amino-1.8-dioxynaphthalene-3.6-disulfonic acid.

In carrying out my invention practically I can proceed as follows, the parts being by weight: 20 parts of para-amino-meta-chloro-diethylanilin are diazotized with 40 parts of hydrochloric acid and 6.9 parts of sodium nitrite and the diazo-compound is introduced into a cooled solution of 36.2 parts of the neutral sodium salt of chromotropic acid (1:8-dioxynaphthalene-3.6-disulfonic acid) in 360 parts of water and 8 parts of sodium hydroxid. Then 40 parts of caustic soda lye of 25% are added. The formation of the dyestuff is complete after a short time and on acidulation with hydrochloric acid the dyestuff is precipitated. It is filtered off and dried.

The new dyestuff is after being dried and pulverized a dark brown powder soluble in water with a blue color and soluble in concentrated sulfuric acid with a reddish-violet color. It dyes wool from acid baths pure blue shades fast to alkalies and to light. Upon reduction with stannous chlorid and hydrochloric acid it yields para-amino-meta-chloro-diethylanilin and 2-amino-1.8-dioxynaphthalene-3.6-disulfonic acid.

The process is carried out in an analogous manner on starting from other para amino-meta - chloro - dialkylanilins *e. g.* the para-amino-meta-chloro-dimethylanilin etc.

Having now described my invention and in what manner the same is to be performed, what I claim is:—

1. The herein-described new blue monoazodyestuffs, obtainable by combining the diazocompounds of para-amino-meta-chloro-dialkylanilins with chromotropic acid, which dyestuffs are after being dried and pulverized dark powders soluble in water with a blue color; yielding upon reduction with stannous chlorid and hydrochloric acid para-amino - meta - chloro - dialkylanilin and 2-amino-1.8-dioxynaphthalene-3.6-disulfonic acid and dyeing wool from acid baths blue shades, substantially as described.

2. The herein-described new azodyestuff obtainable by combining the diazocompound of para-amino-meta-chloro-diethylanilin with 1.8 - dioxynaphthalene - 3.6 - disulfonic acid, which dyestuff is after being dried and pulverized a dark brown powder soluble in hot water with a blue color and soluble in concentrated sulfuric acid with a reddish-violet color; yielding upon reduction with stannous chlorid and hydrochloric acid para - amino - meta-chloro-diethylanilin and 2-amino-1.8-dioxynaphthalene-3.6-disulfonic acid; and dyeing wool from acid baths blue shades, substantially as described.

In testimony whereof I have hereunto set my hand in the presence of two subscribing witnesses.

CARL HEIDENREICH.

Witnesses:
 OTTO KÖNIG,
 HEINR. WICHOFF.